United States Patent [19]

Gesek et al.

[11] 3,957,487

[45] May 18, 1976

[54] HOLDING THE TEMPERATURE OF METAL MELTS OF SPECIFIED COMPOSITIONS

[75] Inventors: Rudolf Gesek; Walter Fadler, both of Vienna, Austria; Georg Böhm, Heddesheim, Germany

[73] Assignee: Elin-Union Aktiengesellschaft fur Elektrische Industrie, Vienna, Austria

[22] Filed: Apr. 17, 1974

[21] Appl. No.: 461,601

Related U.S. Application Data

[62] Division of Ser. No. 246,545, April 24, 1972, Pat. No. 3,819,842.

[52] U.S. Cl. .......................................... 75/49; 75/59
[51] Int. Cl.² ........................................... C21C 7/10
[58] Field of Search ................................... 75/49, 59

[56] References Cited
UNITED STATES PATENTS

| | | | |
|---|---|---|---|
| 2,993,780 | 7/1961 | Allard | 75/59 |
| 2,997,384 | 8/1961 | Feichtinger | 75/59 |
| 3,467,167 | 9/1969 | Mahin | 75/59 |
| 3,574,596 | 4/1971 | Lohman | 75/59 |

*Primary Examiner*—Peter D. Rosenberg
*Attorney, Agent, or Firm*—Cecily L. Frey

[57] ABSTRACT

Method for maintaining the temperature level of metal melts of specified compositions, comprising the steps of a/ excluding oxygen access to a melt contained in a furnace; b/ slowly displacing the atmospheric air from above the melt surface by introducing an inert protective gas, in laminar flow, without the generation of turbulence; and c/ thereafter maintaining above the melt surface a pure protective gas atmosphere, to meet a consumption of between 0.1 and 1% of the volumetric capacity of the furnace per minute, this permitting the melt to be cast in several pours or continuously without oxidaton of the alloying components and without increase in its gas content, even hours after having been melted down.

5 Claims, 6 Drawing Figures

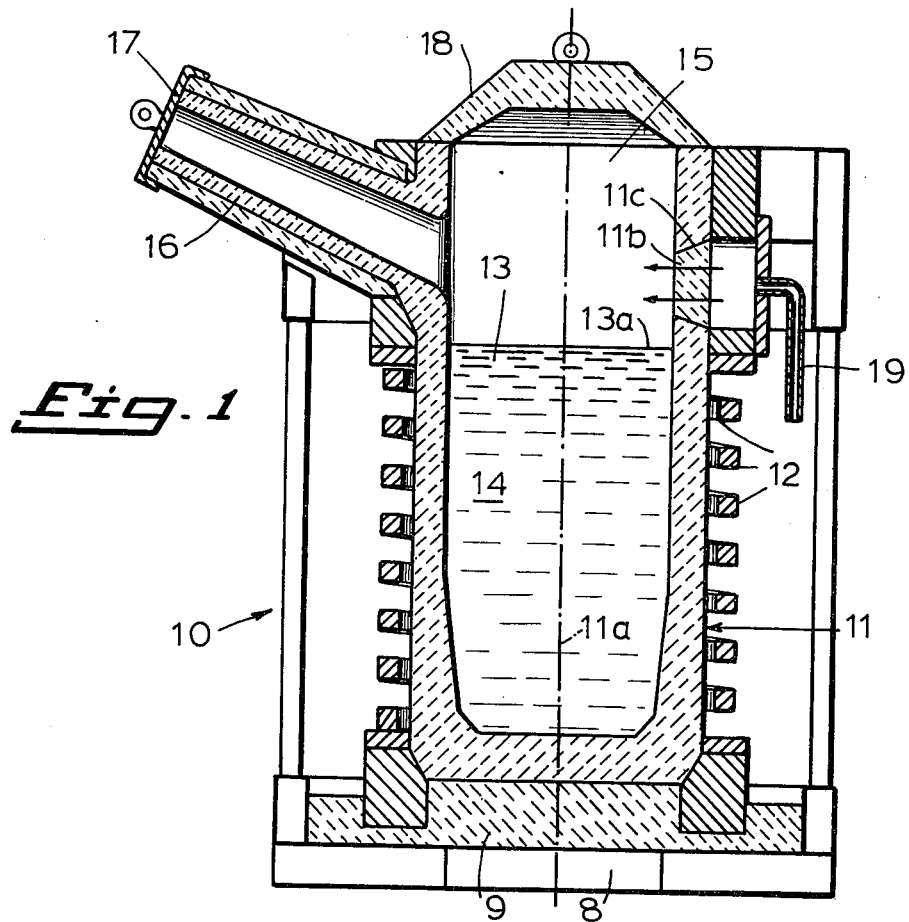
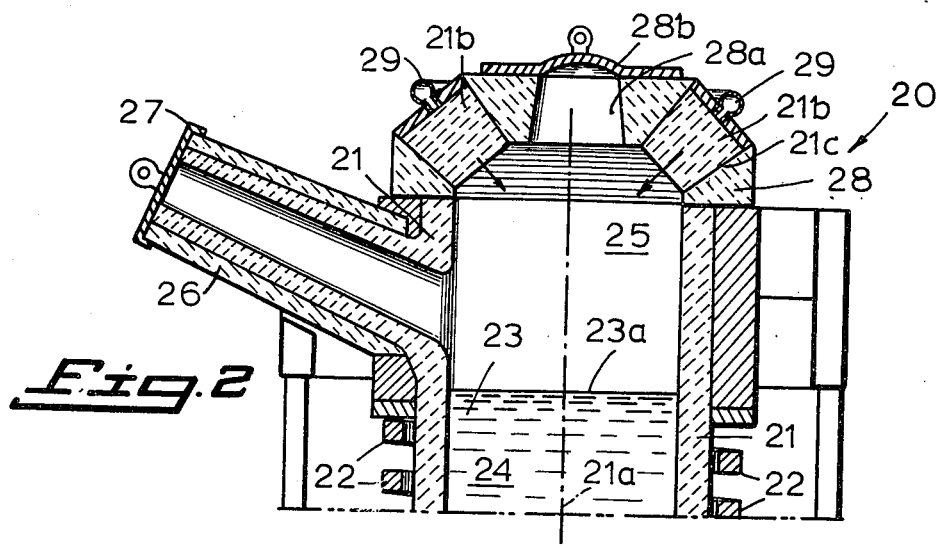

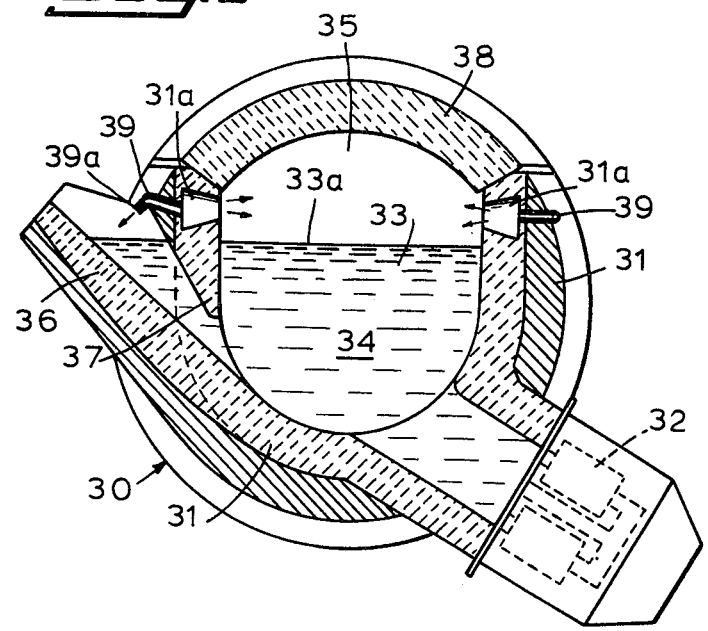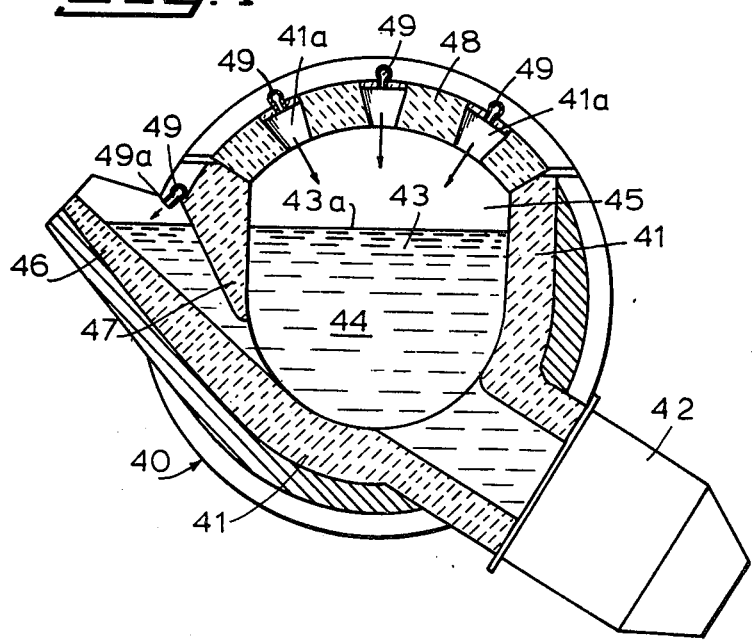

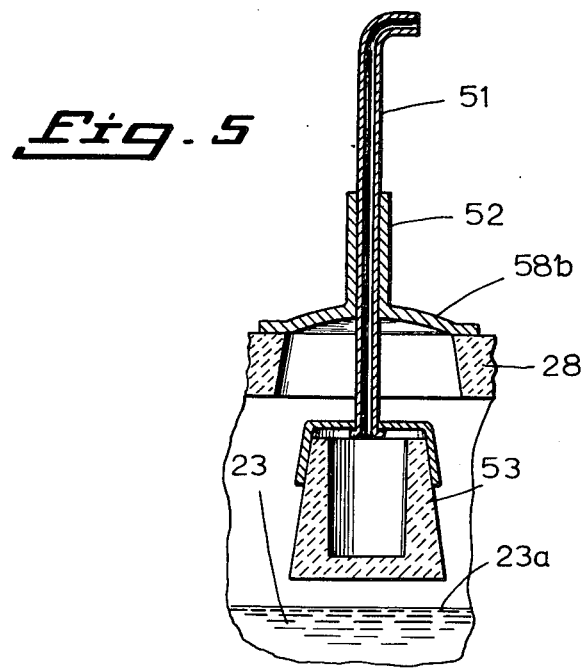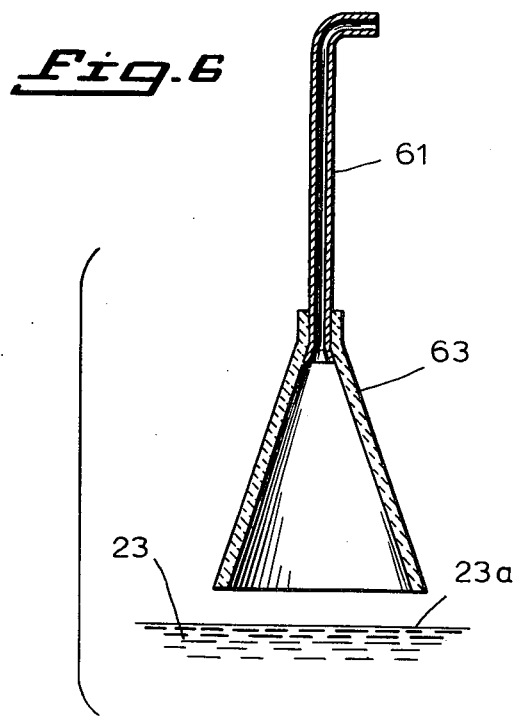

HOLDING THE TEMPERATURE OF METAL MELTS OF SPECIFIED COMPOSITIONS

This is a divisional of the parent application Ser. No. 246,545, filed Apr. 24, 1972 by the applicants under the title "Method and Furnace for Maintaining the Temperature Level of Metal Melts", now U.S. Pat. No. 3,819,842 dated June 25, 1974, titled "Furnace for Maintaining the Temperature Level of Metal Melts".

The invention relates to a method and a furnace for maintaining the temperature level of metal melts of specified compositions, particularly of cast steel, which require preventing an oxidation loss of alloying components and an increase in gas content during the holding or maintaining period.

A method is already known for purifying the melt in a metallurigical induction-type furnace without the application of vacuum, which comprises introducing an inert gas for stirring the melt below the molten surface. This earlier method concerns a treatment of special high-alloy steels, comprising agitating of the melt by the inert gas introduced from the bottom.

However the employment of this method for keeping a melt hot for many hours is impractical for economic reasons along since excessively large volumes of gas would have to be supplied and consumed. Due to the turbulence that is generated by the inert gas entering from below in a powerful stream for agitating the melt or bath, sometimes also entering through a pipe from above, an immediate and complete intermixture of the atmospheric air originally present above the melt surface with the inflowing inert gas will occur, and the production of a pure inert gas atmosphere would require the provision of at least 10 to 20 times the quantity of noble gas consumed in the method according to the present invention.

On the other hand, for the protection of bulkier cast-iron parts, large holding furnaces are usually provided which can be charged from small melting furnaces until the amount of molten metal required for pouring has been collected. This saves the capital expenditure involved in the provision of a large and expensive melting furnace, a fact that is of particular advantage when large castings are only occasionally needed.

Moreover, foundries possessing only small-capacity melting furnaces are thus, nevertheless, equipped to produce large castings. At the same time, this conventional method of holding the temperature of melts offers the possibility of producing shaped castings in mechanized or automated plants since a continuous supply of liquid material is made available.

During the collection of a cast-iron melt in a holding furnace, the melt is exposed to the atmosphere so that oxidation may cause the composition of the melt to change. In a cast-iron melt having the usual carbon content of about 3.5% by weight, oxidation loss amounting to about 0.1% carbon caused by atmospheric oxygen is not of considerable significance, and the liquid cast iron can remain in a holding furnace for prolonged periods without undergoing detectable or undesirable changes.

This method which as such is advantageous for the production of iron castings cannot be used for cast steel because the latter has a substantially lower carbon content than ordinary cast iron, namely in the order of only 0.1 to 0.2%. Any oxidation loss of alloying elements during the holding period would therefore reduce the carbon content of the molten cast steel to a level representing only a fraction of the required carbon content.

In the same way, other alloying additions, such as silicon and the like, would be attacked by the atmosphere which would also introduce hydrogen and oxygen into the melt and allow these elements to react with components of the melt. Due to all these factors a cast-steel melt that had been kept hot in atmospheric air for a longer period of time would no longer have the specified composition, and a casting produced from such a melt would not have the technological qualities to be expected from the original composition of the melt.

For this reason, all steel castings are cast directly from the melting crucible, and advantages afforded by the above-described method of producing cast-iron parts were not available for steel castings.

The present invention provides a method for maintaining the temperature level of metal melts of specified compositions, for example steel melts. The method comprises the steps of (a) closing a furnace after a first batch of melt has been filled into the furnace; (b) slowly displacing the atmospheric air from above the metal melt surface by introducing in laminar flow, without the generation of turbulence, a gas that functions as a protective gas by being inert to the melt, preferably in volumes equal to at least 1.3 times the volumetric capacity of the holding furnace, more preferably 2.5 to 5 times this capacity; and (c) thereafter maintaining, even after further batches of melt have been charged, a pure protective gas atmosphere in the furnace interior, above the melt surface, at an excess pressure of 0.05 to 0.5 atmospheres. This is done by blowing in more protective gas to meet a consumption of between 0.1 and 1% of the volumetric capacity of the holding furnace per minute, thereby preventing atmospheric air from gaining access to the melt, and permitting the latter to be cast in one or several fractional pours, or cast continuously, without oxidation of the alloying components and without increase in its gas content, even hours after having been melted down.

According to an important feature of the invention, the protective gas is introduced in laminar flow during the displacement of the atmospheric air at a pressure of about 1.5 atmospheres excess pressure, whereas the protective gas atmosphere is subsequently maintained by the application of an excess pressure of about 0.5 atmospheres.

Argon or some other noble gas that is heavier than air may be used as protective gas.

The introduction in laminar flow of the protective gas may be effected, according to another important feature of the invention, just above the surface of the bath or melt through the furnace wall or from below the bottom edge of the furnace cover.

Other objects and many of the attendant advantages of the invention will be readily appreciated as the same becomes better understood by reference to the following detailed description, when considered with the accompanying drawings, wherein FIG. 1 shows, in a longitudinal section, an exemplary induction-type crucible furnace for practising the inventive method in which the protective gas is introduced from the furnace wall, closely above the highest level of the bath or melt, through an annular gas-permeable refractory brick located near the underside of the furnace cover;

FIG. 2 shows a modified embodiment of the top part of the furnace of FIG. 1;

FIG. 3 is a schematic illustration, partly in section, of a tiltable barrel-type furnace fitted with an externally located inductor, in which the gas supply is through expansion chambers provided in the uppermost part of the furnace walls;

FIG. 4 is a furnace of the same type as shown in FIG. 3, in which the gas supply is provided through chambers built into the furnace cover; and FIGS. 5 and 6 show elevationally adjustable pipe means for the introduction of the protective gas, closely above the existing level of the melt, compatible with any of the furnace embodiments of FIGS. 1 through 4.

With reference first to FIG. 1, a crucible 11 of the furnace 10 is mounted on base members 8 and 9. The furnace embodiments and structural features are presented herein for an illustration of the preferred manner in which the method according to the invention can be carried out. The crucible has a vertical axis 11a and is surrounded by an induction coil 12. A cast-steel melt or bath 13 is contained in its furnace chamber 14, the highest level of the bath being at 13a. The space 15 above the melt surface is sealed by a cover 17 placed over the end of a pouring spout 16, and a furnace cover 18 closes the top of the crucible 11. Through a gas-supply pipe 19, an inert gas is forced at an excess pressure of about 1.5 atmospheres through a gas-permeable refractory brick 11b set into the crucible wall just above the maximum level 13a of the melt and pressed down on its conical seat 11c.

Passing through this brick 11b, the gas enters the space 15, which at first contains atmospheric air, in laminar flow. If a noble gas heavier than air, preferably argon, is used as an inert gas, the atmospheric air will be gradually displaced upwardly through the joints of the cover 18 by a cushion of heavier gas that gradually builds up from the surface 13a of the melt in upward direction. Naturally some slight turbulence and hence mixing of the noble gas with the air cannot be entirely avoided bu the boundary layer can nevertheless be kept fairly thin if the condition of entry of the noble gas in laminar flow is adhered to.

This is a necessary condition for an economically acceptable employment of a protective gas, and in the most favorable circumstances the volume of protective gas that must be used during the period of air displacement will be 1.3 times the volumetric capacity of the furnace, though in the normal case between 2.5 and 5 times this volume must be introduced for a pure protective gas atmosphere to be established and later maintained above the melt level in space 15. However if turbulent conditions arise when the protective gas is being introduced, then the gas volume that is needed will rise to at least ten times this value.

Following the period of air displacement, which in the case of a furnace for one metric ton of molten cast steel takes between 15 and 40 minutes, the introduction of protective gas is continued at an excess pressure of about 1.5 atmospheres, there being a continuous gas consumption per minute of 0.1 to 1% of the furnace capacity, and a protective-gas excess pressure of 0.05 to 0.5 atmospheres will become established in the space 15. In the case of larger-capacity furnaces, this consumption is relatively lower than in smaller furnaces because large-capacity furnaces can be better sealed than small furnaces. Large-capacity holding furnaces therefore prove to be economically superior.

In the case of the modified furnace 20 shown in FIG. 2, the general conditions are quite similar to those already described but in this embodiment a cover 28 has a special central charging opening 28a which can be closed with a second, smaller cover 28b. Moreover, the furnace cover 28 carries a ring-shaped gas-supply pipe 29 for feeding gas to a gas-permeable refractory brick 21b which is concentric with the crucible axis 21a, and which is pressed down on a seat 21c so that it can serve as a bearing element for the center part of the furnace cover 28.

The gas admitted to the annular brick 21b in laminar flow sinks to the surface 23a of the melt and slowly displaces the air in the upward direction. Parts of the modified furnace designated by numerals 21 through 27 are quite similar to those described with reference to FIG. 1, namely parts 11 through 17 thereof.

The tiltable cylinder furnace 30 shown in FIG. 3 is provided with a lining 31 and has a temperature holding inductor 32 preferably attached to the right-hand lower part of the cylinder. The cast-steel melt 33, of which 33a is the maximum permissible level, fills about two-thirds of the furnace chamber 34. The space 35 above the level 33a of the melt, which is first filled with atmospheric air, is closed, on the one hand, by a partition 37 which acts as a syphon in a pouring spout 36 and, on the other hand, by a furnace cover 38. This furnace is discharged by rotatably tilting it to the left.

Gas-supply pipes 39 feed gas to preferably annularly disposed gas-pressure reducing chambers 31a set into the walls of the lining 31 of the cylinder furnace 30, closely above the highest level 33a of the melt. From these chambers 31a, which function like an exhaust for deflecting the expanding stream of gas, the protective gas spreads, preferably by the interposition of baffles (not shown in the drawings), for deflecting the expanding stream of gas, in laminar flow across the surface 33a of the melt and gradually builds up a cushion which displaces the air.

Since in the embodiments shown in FIGS. 3 and 4, the latter to be described somewhat later, a small portion of the bath surface would be exposed to the atmosphere in the pouring spout 36 unless special precautions are taken, an additional outlet 39a, which may be formed by a gas-permeable brick, may be arranged to build up a blanket of protective gas over this part of the melt surface as well. Naturally the pouring spout 36 may also be provided with a separate cover (not shown in the drawings).

The tiltable cylinder furnace 40 according to FIG. 4 differs from the embodiment according to FIG. 3 only in that gas-supply pipes 49 and gas-pressure reducing chambers 41a are provided on, respectively in, a cover 48 of the crucible or lining 41 proper, and that the cushion of protective gas builds up as in FIG. 2. It will be understood by those skilled in the art that parts 42 through 47 and the maximum melt surface 43a are similar to those described in the previous embodiment under numerals 32 through 37 and 33a.

FIG. 5 shows a device, adjustable in height, for conveying the protective gas to a point closely above the surface of the melt (e.g. 13, 23, etc.). As a matter of example, the device of FIG. 5 is shown in relation to certain parts of the embodiment of FIG. 2, consisting of a pipe 51 which is slidably mounted inside a sealing tube 52 formed on a cover 58b (similar to 28b of FIG.

2), whereas the bottom end of the pipe 51 carries a pot-shaped, gas-permeable and refractory flushing brick 53. Numerals 23, 23a constitute the metal melt proper and its highest level, as in FIG. 2.

In FIG. 6, the just described flushing brick is replaced by an inverted ceramic funnel 63 which functions as a gas-pressure reducing chamber. Pipe 61, for introducing the protective gas, is similar to slidable pipe 51 of the previous embodiment.

Both arrangements are particularly suitable to be fitted into existing furnaces of the general structure as shown in FIGS. 1 and 2. The lids or covers of the exemplary holding furnaces 10, 20 are of course easily adapted to allow the sliding and gas-tight introduction of the respective pipes 51, 61.

It will be understood by those skilled in the art that the optional devices of FIGS. 5 and 6 allow the protective gas to be introduced much closer to the melt surface, without gas losses, and they permit the consumption of the protective gas to be minimized during the air-displacement phase. The operation is furthermore speeded up and turbulence is positively avoided by the provision of these devices.

The flushing brick 53 distributes the introduced gas evenly over a considerable area of the melt surface, while the inverted funnel member 63 serves a similar purpose and additionally reduces the gas pressure, as applied to a unit surface of the melt, because of its outwardly flaring lower end.

The drawing is simplified in FIGS. 5, 6 in respect of conventional means for moving the elements of the devices to specified elevations, immobilizing them at a desired level, and for providing the required degree of gas-tightness, which will be self-explanatory to those familiar with this art.

It should be understood that in all embodiments described, the gas-permeable refractory bricks and the gas-pressure reducing chambers (e.g. 11b, 21b, 31a, 41a) may be located either in the furnace walls or in the covers (e.g. 11, 21, etc. and/or 17, 27; 28b, etc.) in any desired combination.

Moreover, it is also possible to take protective-gas samples and to examine them for instance by gas chromatography, or alternatively to measure the oxygen content continuously by electrical means to check for the presence or absence of air. However such measurements are largely unnecessary once the functioning of a holding furnace according to the invention has been empirically tested and comparable operations are repeated under the same conditions.

Besides argon, xenon, krypton or neon may be used as inert gas, the selection of the gas as well as the performance of the proposed method being controlled by the costs involved. In principle it would of course also be possible to use helium in which case gas outlets arranged at a high level would be beneficial.

The invention permits molten cast-steel alloys to be kept in one of the exemplary furnaces described hereinabove, for longer periods of time, for instance for 10 hours, without oxidation loss of alloying elements, so that the compositions and the technological properties of the finished castings do not deviate from the specified values. This result enables foundries to produce shaped cast-steel parts in an extremely economical manner.

Moreover, the invention enables large as well as small steelworks to produce large steel castings having compositions that comply exactly with specifications, without the need for large melting furnaces. Another advantage afforded by the invention resides in the fact that air pollution is also reduced because hitherto the production of large high-quality steel castings required the provision of a gas-heated melting furnace of corresponding size whereas the invention can be performed with relatively small furnaces which generate no exhaust gases because they are electrically heated. Finally, the invention provides a basis for considering the continuous casting of steel.

An example of performing the inventive method is given in the following. An induction-type crucible furnace of the kind shown in FIG. 2, having a capacity of 0.1 cu.m, was filled with a CK–22 grade cast-steel melt. As soon as the melting process has been completed, the furnace was closed and argon was introduced at an excess pressure of 2 atmospheres through the gas-permeable refractory brick 21b so that it entered in laminar flow. After the gas had been introduced for 30 minutes with the consumption of 3 cu.m (S.T.P.) of argon, the oxygen content had fallen to 0.1%.

During the following holding period it was possible, by continuously blowing in argon at the rate of 5 liters per minute at an excess pressure of 0.5 atmospheres, further to reduce the oxygen content to 100 ppm and to maintain it at this level, the excess pressure inside the furnace being about 0.15 atm. After a holding time of 8 hours the CK–22 cast-steel melt could be poured without correction of the analysis and without further additives.

It should be understood, of course, that the foregoing disclosure relates only to preferred embodiments of the invention and that it is intended to cover all changes and modifications of the examples described which do not constitute departures from the spirit and scope of the invention.

What we claim is:

1. A method for maintaining the temperature level of steel melts comprising the steps of
    a. excluding oxygen access to the melt contained in the furnace;
    b. slowly displacing the atmospheric air from above the melt surface by introducing an inert protective gas in laminar flow without the generation of turbulence, in a volume equal to 2.5–5 times the volumetric capacity of the furnace and at air excess pressure of substantially 1.5 atm., the time of displacement being about 30 minutes per each cubic meter in order to reduce the oxygen content from atmospheric to 0.1%; and
    c. thereafter maintaining above the melt surface a pure protective gas atmosphere at an excess pressure of substantially 0.5 atm. by blowing in more protective gas to meet the consumption of between 0.1 and 1% of the volumetric capacity of the furnace per minute this permitting the melt to be cast without oxidation of the alloying components and without increase in its gas content, even hours after having been melted down.

2. The process according to claim 1, wherein the casting is carried out continuously.

3. The process according to claim 1, wherein the casting is carried out in several pours.

4. The method as defined in claim 1, wherein the protective gas is selected from a group of noble gases heavier than air, consisting of argon, xenon, krypton, neon and helium.

5. The method as defined in claim 1, wherein the laminar introduction of the protective gas in step (b) is effected closely above the melt surface.

* * * * *